(12) United States Patent
Moser et al.

(10) Patent No.: US 9,718,047 B2
(45) Date of Patent: Aug. 1, 2017

(54) SYSTEMS AND METHODS FOR SEPARATING CHLORINE-CONTAINING SPECIES FROM AQUEOUS SOLUTIONS OF CHLORINE-CONTAINING SPECIES

(71) Applicant: UOP LLC, Des Plaines, IL (US)

(72) Inventors: Mark D. Moser, Elk Grove Village, IL (US); David A. Wegerer, Lisle, IL (US)

(73) Assignee: UOP LLC, Des Plaines, IL (US)

( * ) Notice: Subject to any disclaimer, the term of this patent is extended or adjusted under 35 U.S.C. 154(b) by 55 days.

(21) Appl. No.: 14/062,696

(22) Filed: Oct. 24, 2013

(65) Prior Publication Data

US 2015/0119232 A1  Apr. 30, 2015

(51) Int. Cl.
| | |
|---|---|
| *B01J 38/02* | (2006.01) |
| *B01J 23/96* | (2006.01) |
| *B01J 38/12* | (2006.01) |
| *B01J 38/18* | (2006.01) |
| *C10K 1/00* | (2006.01) |
| *C10K 1/10* | (2006.01) |

(52) U.S. Cl.
CPC .............. *B01J 23/96* (2013.01); *B01J 38/02* (2013.01); *B01J 38/12* (2013.01); *B01J 38/18* (2013.01); *C10K 1/003* (2013.01); *C10K 1/101* (2013.01); *Y02P 20/584* (2015.11)

(58) Field of Classification Search
CPC ... B01J 23/96; B01J 38/12; B01J 38/18; B01J 38/02; C10K 1/003; C10K 1/101; Y02P 20/584
USPC ..................................... 502/20–56
See application file for complete search history.

(56) References Cited

U.S. PATENT DOCUMENTS

| | | | |
|---|---|---|---|
| 2,367,301 A | 1/1945 | Mohr | |
| 2,673,788 A | 3/1954 | Chipman | |
| 3,201,201 A | * 8/1965 | Van Dijk et al. | ............. 423/502 |
| 5,087,792 A | 2/1992 | Cottrell et al. | |
| 5,837,636 A | 11/1998 | Sechrist et al. | |
| 5,965,473 A | 10/1999 | Sechrist et al. | |

(Continued)

OTHER PUBLICATIONS

Li, et al., "Development and Application of Dechlorination Absorbents for Catalytic Reforming," Petroleum Processing and Petrochemicals, v 37, n 2, p. 24-29, Feb. 2006, ISSN: 10052399.

*Primary Examiner* — Jennifer A Smith

(57) ABSTRACT

Disclosed is a method for separating a chlorine-containing species from an aqueous solution of the chlorine-containing species in a catalytic hydrocarbon conversion process that includes the step of oxidizing a spent chloride-containing hydrocarbon conversion catalyst, the spent hydrocarbon conversion catalyst including a hydrocarbon residue formed thereon. The oxidizing forms a flue gas including chlorine-containing species, water, and oxides of carbon. The method further includes contacting the flue gas with a water scrubbing stream to dissolve at least a portion of the chlorine-containing species in the water scrubbing stream to form an aqueous acid solution and contacting the aqueous acid solution with a hygroscopic liquid to generate dehydrated hydrogen chloride gas. Still further, the method includes contacting the dehydrated hydrogen chloride gas with additional spent chloride-containing hydrocarbon conversion catalyst to sorb chlorine onto the additional spent chloride-containing hydrocarbon conversion catalyst.

17 Claims, 2 Drawing Sheets

(56) References Cited

U.S. PATENT DOCUMENTS

| | | |
|---|---|---|
| 6,117,809 A | 9/2000 | Sechrist et al. |
| 6,123,833 A | 9/2000 | Sechrist et al. |
| 6,153,091 A | 11/2000 | Sechrist et al. |
| 6,290,916 B1 | 9/2001 | Sechrist et al. |
| 6,461,992 B1 | 10/2002 | Sechrist et al. |
| 6,784,132 B1 | 8/2004 | Sechrist |
| 6,790,802 B1 | 9/2004 | Sechrist |
| 6,881,391 B1 | 4/2005 | Sechrist |
| 8,092,769 B2 | 1/2012 | Jewell et al. |
| 2008/0156699 A1* | 7/2008 | Yuan .................. B01D 53/04 208/139 |

* cited by examiner

SYSTEMS AND METHODS FOR SEPARATING CHLORINE-CONTAINING SPECIES FROM AQUEOUS SOLUTIONS OF CHLORINE-CONTAINING SPECIES

TECHNICAL FIELD

The present disclosure generally relates to systems and methods for separating chlorine-containing species from aqueous solutions of such chlorine-containing species. More particularly, the present disclosure relates to systems and methods for separating chlorine-containing species, such as hydrogen chloride (HCl), from aqueous solutions of such chlorine-containing species produced in catalytic hydrocarbon conversion processes.

BACKGROUND

Although catalysts for the conversion of hydrocarbons (for example, reforming, dehydrogenation, isomerization, alkylation, and transalkylation) have a tendency to deactivate after a period of use, a catalyst's activity may be restored by one of a number of processes that are known generally as regeneration processes. Regeneration processes are extensively used, and the specific steps included in a regeneration process depend in part on the reason for the deactivation. For example, if the catalyst deactivated because coke deposits accumulated on the catalyst, regeneration usually includes removing the coke by burning. Operating conditions and methods for regeneration processes are well known. Regeneration processes may be carried out in situ, or the catalyst may be withdrawn from the vessel in which the hydrocarbon conversion takes place and transported to a separate regeneration zone for reactivation. Arrangements for continuously or semicontinuously withdrawing catalyst particles from a reaction zone and for reactivation in a regeneration zone are also well known.

Many of these regeneration processes share the common feature of contacting the catalyst in the presence of one or more chlorine-containing species that restore the activity of the catalyst for use in the reaction zone. These chlorine-containing species may be chemically or physically sorbed on the catalyst as chloride or may remain dispersed in a stream that contacts the catalyst. In many regeneration processes, however, a flue gas stream containing the chlorine-containing species is vented from the regeneration process. Several methods have been used for preventing contamination of the flue gas stream with the chlorine-containing species and minimizing the release of the chlorine-containing species in the flue gas stream from the regeneration process. Emissions of chlorine-containing species, apart from the effect of the loss of chloride on the catalyst, pose environmental concerns. The environmental concerns may be abated either by scrubbing the flue gas stream with an aqueous, basic solution that neutralizes the chlorine-containing species or by adsorbing the chlorine-containing species on an adsorbent. In some adsorbent configurations, the conversion catalyst itself (whether in regenerated or deactivated form) may serve as the adsorbent.

The chlorine-removal problem is compounded by water in the flue gas stream, and as a result traditional adsorbents are not economically viable for adsorbing chlorine-containing species from flue gas streams. In order to be economically viable, an adsorbent, while removing a high proportion of the chlorine-containing species from the flue gas stream, must adsorb for example from about 7 to about 8 percent of its weight in chloride. In order to adsorb that much chloride, the flue gas must have a low water content, for example less than about 0.01 mol-% water. Water competes with chlorine-containing species for adsorption sites on the adsorbent, and by occupying sites that would otherwise be occupied by chlorine-containing species, water hinders the adsorption of chloride and hastens replacement of the adsorbent. Thus, if the flue gas has a high water content, the adsorbent adsorbs too much water and is incapable of adsorbing a viable amount of chloride. Because water is a common by-product of coke combustion as a result of the hydrogen-containing compounds that may be found in coke, flue gas streams often do have a high water content, for example from about 1 to about 10 mol-%. As a consequence, unless the flue gas is dried, an adsorbent will adsorb only one-third to one-half of the weight of chloride required for economic viability. This, in turn, may make the adsorption process uneconomical to implement. Although in theory the adsorption of water can be mitigated by drying the flue gas stream prior to adsorbing the chlorine-containing species, in fact a drier is costly as well as impractical because chlorine-containing species such as hydrogen chloride tend to degrade most desiccants.

Accordingly, it is desirable to provide improved methods and systems for preventing the venting of chlorine-containing species during hydrocarbon conversion catalyst regeneration. Additionally, it is desirable to provide such systems and methods that are able to separate the water from the chlorine-containing species to increase the economy of the catalyst regeneration process. Furthermore, other desirable features and characteristics of the present invention will become apparent from the subsequent detailed description and the appended claims, taken in conjunction with the accompanying drawings and this background.

BRIEF SUMMARY

The present disclosure provides systems and methods for separating chlorine-containing species, such as hydrogen chloride (HCl), from aqueous solutions of such chlorine-containing species in catalytic hydrocarbon conversion processes. In one exemplary embodiment, disclosed is a method for separating a chlorine-containing species from an aqueous solution of the chlorine-containing species in a catalytic hydrocarbon conversion process that includes oxidizing a spent chloride-containing hydrocarbon conversion catalyst, the spent hydrocarbon conversion catalyst including a hydrocarbon residue formed thereon. The oxidizing forms a flue gas including chlorine-containing species, water, and oxides of carbon. The method further includes contacting the flue gas with a water scrubbing stream to dissolve at least a portion of the chlorine-containing species in the water scrubbing stream to form an aqueous acid solution and contacting the aqueous acid solution with a hygroscopic liquid to generate dehydrated hydrogen chloride gas. Still further, the method includes contacting the dehydrated hydrogen chloride gas with additional spent chloride-containing hydrocarbon conversion catalyst to sorb chlorine onto the additional spent chloride-containing hydrocarbon conversion catalyst.

In another exemplary embodiment, disclosed is a system for separating a chlorine-containing species from an aqueous solution of the chlorine-containing species in a catalytic hydrocarbon conversion process that includes a combustion zone that oxidizes a spent chloride-containing hydrocarbon conversion catalyst, the spent hydrocarbon conversion catalyst including a hydrocarbon residue formed thereon, and that forms a flue gas including chlorine-containing species, water, and oxides of carbon and a scrubbing unit that contacts the flue gas with a water scrubbing stream to dissolve at least a portion of the chlorine-containing species in the water scrubbing stream to form an aqueous acid solution. The system further includes an extractive distillation unit that contacts the aqueous acid solution with a hygroscopic liquid to generate hydrogen chloride gas and a sorbtion zone that contacts the hydrogen chloride gas with additional spent chloride-containing hydrocarbon conversion catalyst or with oxidized chloride-containing hydrocarbon conversion catalyst to sorb chlorine onto the additional spent or oxidized chloride-containing hydrocarbon conversion catalyst.

In yet another exemplary embodiment, disclosed herein is a method for separating a chlorine-containing species from an aqueous solution of the chlorine-containing species including oxidizing a spent chloride-containing hydrocarbon conversion catalyst, the spent hydrocarbon conversion catalyst comprising a hydrocarbon residue formed thereon, wherein the oxidizing forms a flue gas comprising chlorine-containing species, water, and oxides of carbon and contacting the flue gas with a water scrubbing stream to dissolve at least a portion of the chlorine-containing species in the water scrubbing stream to form an aqueous acid solution. Still further, the method includes contacting the aqueous acid solution with a hygroscopic liquid to generate a dehydrated hydrogen chloride gas and contacting the dehydrated hydrogen chloride gas with the oxidized chloride-containing hydrocarbon conversion catalyst to sorb chlorine onto the oxidized chloride-containing hydrocarbon conversion catalyst.

BRIEF DESCRIPTION OF THE DRAWINGS

The present embodiments will hereinafter be described in conjunction with the following drawing Figures, wherein like numerals denote like elements, and wherein.

DETAILED DESCRIPTION

Figure 1:
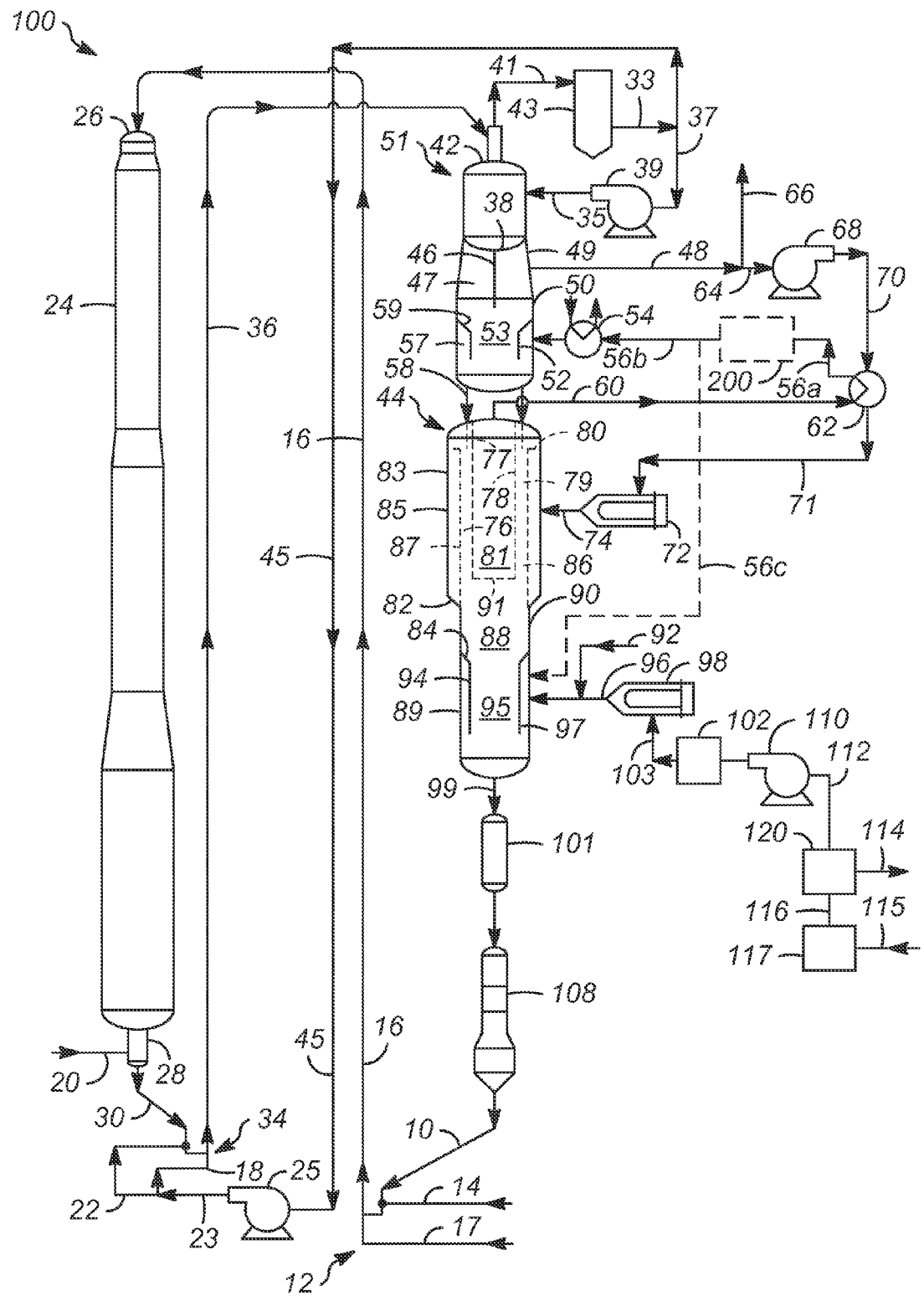
FIG. 1 is a process flow diagram illustrating a method implemented on a hydrocarbon conversion system in accordance with various embodiments of the present disclosure.

The following detailed description is merely exemplary in nature and is not intended to limit the application and uses of the embodiments described. Furthermore, there is no intention to be bound by any theory presented in the preceding background or the following detailed description.

The various embodiments described herein relate to systems and methods for separating chlorine-containing species, such as hydrogen chloride (HCl), from aqueous solutions of chlorine-containing species formed in catalytic hydrocarbon conversion processes, and in particular in the regeneration of hydrocarbon conversion catalysts. Exemplary embodiments employ a hygroscopic liquid, such as solutions of sulfuric acid, to reduce the water content of the flue gas prior to contacting the flue gas with a chlorine-containing species adsorbent, such as a portion of the catalyst (in either deactivated or partially-regenerated form) or another chlorine adsorbent. With a reduced water content, the efficiency and economy of the catalyst regeneration process are increased, and the need for adsorbent replacement is decreased (where a separate chlorine adsorbent is employed).

While the embodiments described herein are directed primarily to chlorine-containing species, it will be appreciated that the described embodiments may be used to reduce the emissions of other halogen-containing species from any process that uses adsorbents that can sorb halogen-containing species and from which halogens can be removed. Although halogens may include fluorine, bromine, and iodine, as noted above, in many known processes, the halogen is chlorine. Accordingly, the described embodiments are particularly applicable to reducing the emissions of chloro-species. The term "chloro-species" herein refers to any molecule that contains chlorine. For example, chloro-species include chlorine, hydrogen chloride, chlorinated hydrocarbons with or without oxygen, and compounds containing chlorine and a metal.

Generally, the adsorbents that may sorb chloro-species include inorganic oxides, for example alumina. The alumina may be present alone or it may be combined with a porous inorganic oxide diluent as a binder material. The alumina may be present in any of its solid phases, such as gamma-alumina. The alumina may also be present as a chemical combination with other elements such as silica-aluminas or alumino-silicate clays. Because many hydrocarbon conversion catalysts include alumina, in some embodiments, the chloro-species adsorbent may be the hydrocarbon conversion catalyst itself, in either a deactivated ("spent") form or in a regenerated form. Suitable alumina-based hydrocarbon conversion catalyst include catalysts for reforming, dehydrogenation, isomerization, alkylation, transalkylation, and other catalytic conversion processes. A widely practiced catalytic hydrocarbon conversion process to which the presently-described embodiments are applicable is catalytic reforming Therefore, the discussion of the embodiments herein will refer to its exemplary application in a catalytic reforming reaction system.

As such, the exemplary systems and methods for separating the chlorine-containing species from aqueous solutions in the regeneration of a hydrocarbon conversion catalyst are provided herein in the context of an exemplary catalytic reforming process. Catalytic reforming is a well-established hydrocarbon conversion process employed in the petroleum refining industry for improving the octane quality of hydrocarbon feedstocks, the primary product of reforming being motor gasoline. Briefly, in catalytic reforming, a feedstock is admixed with a recycle stream including hydrogen and contacted with catalyst in a reaction zone. The usual feedstock for catalytic reforming is a petroleum fraction known as naphtha, which has an initial boiling point of about 180° F. (82° C.) and an end boiling point of about 400° F. (204° C.).

A catalytic reforming reaction is normally effected in the presence of catalyst particles including of one or more Group VIII noble metals (e.g., platinum, iridium, rhodium, palladium) and a halogen combined with a porous carrier, such as a refractory inorganic oxide. As noted above, the halogen may be chloride, and alumina may be used as the carrier. In one exemplary embodiment, the catalyst is a platinum/tin (Pt/Sn) on chlorided alumina catalyst. During the course of a reforming reaction, catalyst particles become deactivated as a result of mechanisms such as the deposition of coke on the particles. That is, after a period of time in use, the ability of catalyst particles to promote reforming reactions decreases to the point that the catalyst is no longer useful. As such, it is desirable to recondition or regenerate the catalyst before it is reused in the reforming process.

Embodiments of the present disclosure are broadly applicable to a reforming process with fixed-or moving-bed reaction zones and at least one moving-bed regeneration zone. In such processes, fresh catalyst particles are fed to a reaction zone, which may include several subzones, and the particles flow through the zone by gravity. Catalyst is withdrawn from the bottom of the reaction zone and transported to a regeneration zone where a hereinafter-described multi-step regeneration process is used to regenerate the catalyst to restore its full reaction promoting ability. Catalyst flows by gravity through the various regeneration steps and then is withdrawn from the regeneration zone and furnished to the reaction zone. Catalyst that is withdrawn from the regeneration zone is termed regenerated catalyst.

Reference is now made to FIG. 1, which is a process flow diagram illustrating a method implemented on a hydrocarbon conversion system in accordance with various embodiments of the present disclosure. In particular, FIG. 1 illustrates an exemplary hydrocarbon reforming system 100 that employs a sorption system to remove chloro-species from a flue gas stream produced in a catalyst regeneration zone in accordance with some embodiments of the present disclosure. As noted above, other hydrocarbon conversion system arragments are also suitable for use with the embodiments described herein. Starting with the movement of catalyst, a lower conduit 10 supplies catalyst particles to a non-mechanical valve 12. A regulating fluid that may include, for example, hydrogen gas ($H_2$), enters valve 12 through a conduit 14 at a rate that regulates the transfer of catalyst particles through the valve 12 into a lift conduit 16. Non-mechanical valve 12 may be provided in any known configuration, such as an L valve, J valve, or a K valve. As catalyst particles enter lift conduit 16, a lift fluid which may also include hydrogen gas enters the bottom of the lift conduit through a conduit 17 and transports the catalyst particles upwardly through lift conduit 16 to a top portion 26 of a stacked reactor arrangement 24, into which the particles and lift fluid enter.

Catalyst flows from the top portion 26 downwardly through the stacked reactor arrangement 24, passing first through a reduction zone (not separately illustrated), in which a hydrogen-rich gas contacts and reduces the catalyst particles, and from there through multiple stages of reaction in which process fluids contact the catalyst particles (not separatedly illustrated). Details of the contacting beds and other internals of the stacked reactor arrangement 24 are well known to those skilled in the art and permit continuous or intermittent flow of the catalyst particles from the top portion 26 of the stacked reactor arrangement to a lower retention chamber 28 of the bottom of the stacked reactor arrangement 24. A purging fluid including hydrogen enters the lower retention chamber 28 through a conduit 20 at a rate sufficient to purge hydrocarbons from the catalyst particles in lower retention chamber 28.

Deactivated or "spent" catalyst particles containing coke deposits flow from the lower retention chamber 28 through a lower conduit 30 that displaces hydrogen and hydrocarbons from the stream of spent catalyst particles to prevent any carry-over of hydrogen and hydrocarbon to the regenerator. At the bottom of lower conduit 30, a non-mechanical valve 34 operates in a manner similar to that described for non-mechanical valve 12 to transfer spent catalyst particles upwardly through a lift conduit 36. A regulating fluid enters valve 34 through a conduit 22 and a lift fluid enters the bottom of the lift conduit through a conduit 18. Both fluids are provided through a conduit 23 from a blower 25. The lift conduit 36 transfers the spent catalyst away from the stacked reactor arrangement 24 for regeneration of the spent catalyst.

Prior to the discussion of the system components for catalyst generation provided in FIG. 1, a brief overview of catalyst regeneration for the removal of coke is provided herein. As generally known in the art, in a continuous or semicontinuous catalyst regeneration zone, the catalyst is contacted with a hot gas stream containing chloro-species, which is known in reforming processes as recycle gas and is circulated to the regeneration zone, and a flue gas that also contains chloro-species is withdrawn from the zone. If the recycle gas stream contains a low concentration of oxygen of from about 0.5 to about 1.5 vol-%, coke, which accumulated on surfaces of the catalyst while it was in the hydrocarbon conversion reaction zone, the oxygen may be removed by combustion. Coke primarily includes carbon but also includes a relatively small quantity of hydrogen, generally from about 0.5 to about 10 wt-% of the coke. The mechanism of coke removal is oxidation to form carbon monoxide, carbon dioxide, and water. The coke content of spent catalyst may be as much as about 20% by weight of the catalyst weight, but in one example may be from about 5 to about 7% by weight. Within the combustion section, coke is usually oxidized at temperatures from about 900 to about 1000° F. (482 to 538° C.), but temperatures in localized regions may reach about 1100° F. (593° C.) or more. Because of these high temperatures and also because of high water concentrations, catalyst chloride is quite readily removed from the catalyst during coke combustion.

With continued reference to FIG. 1, spent catalyst particles travel up through lift conduit 36 in a manner similar to that described for lift conduit 16, into a disengaging section 42 of a disengaging-sorption vessel 51. Disengaging-sorption vessel 51 is a stacked arrangement of two sections of contacting in which process fluids contact the spent catalyst particles. The upper disengaging section 42 is separated from a lower sorption section 50 by an internal head 38. A frusto-conical transition section 49 connects the disengaging section 42 to the sorption section 50. An internal conduit 46 extends downward from the internal head 38 and permits continuous or intermittent flow of the spent catalyst particles from the disengaging section 42 to the sorption section 50.

In an upper portion of the disengaging section 42, an elutriation fluid enters disengaging section 42 through a conduit 35 at a rate that separates broken or chipped catalyst particles from the whole catalyst particles, which exit the bottom of the disengaging section 42. The catalyst chips pass through a conduit 41 and are filtered from the elutriation fluid in conduit 33 in a dust collector 43. Some of the elutriation fluid in conduit 33 is recycled to the disengaging section 42 through a blower 39, a conduit 37, and the conduit 35. Some of the elutriation fluid in conduit 33 is recycled through the conduit 45 to the blower 25. Thus, in this embodiment the same fluid, which may for example include nitrogen, is used for the elutriation fluid, the regulating fluid to valve 34, and the lift fluid to lift conduit 36.

After removal of catalyst chips in the disengaging section 42, the spent catalyst particles flow downwardly through the sorption section 50. In one embodiment, the sorption section 50 maintains a volume of catalyst that sorbs most of the hydrogen chloride and chlorine that are present in a flue gas stream that is withdrawn from a regenerator vessel 44 through a conduit 60 and is dehydrated in dehydration zone 200 as will be described in greater detail below. In an alternative embodiment, the flue gas stream, after dehydration, is contacted with a separate volume chloro-species adsorbent, apart from the catalyst (not illustrated in the figures).

The sorption section 50 uses catalyst particles, including spent catalyst particles, that have not yet passed to the combustion zone (to be described in greater detail below regarding vessel 44), to remove chloro-species from the flue gas. The sorption section 50 may be configured as any of the well-known arrangements for contacting solid particles with a gas stream and sorbing components from the gas stream onto the solid particles. The sorption section 50, in one embodiment, may include a moving catalyst bed. The direction of the gas flow is preferably countercurrent relative to the direction of movement of the catalyst, but the direction of gas flow can also be cocurrent, crosscurrent, or a combination of countercurrent, cocurrent, and crosscurrent. The shape of the catalyst bed can be rectangular, annular, spherical, or any suitable shape.

The sorption section 50 is operated at sorption conditions effective to sorb at least a portion of the chloro-species from the flue gas stream. The chloride content of the spent catalyst entering the sorption section 50 may be as much as about 5% by weight of the catalyst weight, for example from about 0.1 to about 2.0%. Catalyst that is withdrawn from the sorption section 50 is referred to herein as chlorided catalyst. The temperature in the sorption zone is generally from about 150 to about 900° F. (66 to 482° C.), for example from about 300 to about 500° F. (149 to 260° C.). The catalyst may be cooled prior to entering the sorption section 50. As such, the sorption section 50 may be equipped with cooling means to cool the flue gas or catalyst within the sorption section 50, or the flue gas may be cooled after leaving the combustion zone and prior to entering the sorption section 50. After cooling, the temperature of the flue gas is generally from about 150 to about 900° F. (66 to 482° C.), for example from about 300 to about 500° F. (149 to 260° C.). The pressure in the sorption section 50 is generally from about 0 to about 500 psi (0 to 3447 kPa) absolute, for example from about 15 to about 100 psi (103 to 689 kPa).

The flue gas stream in conduit 60 contains from about 1000 to about 5000 mol-ppm hydrogen chloride and from about 25 to about 100 mol-ppm chlorine. The flue gas stream that flows through conduit 60 passes to a heat exchanger 62. Heat exchanger 62 removes a portion of the heat from the flue gas stream that is leaving the regenerator vessel 44 in conduit 60 and transfers heat to a hereinafter-described recycle gas stream that is returning to the regenerator vessel 44 in conduit 70. In some embodiments, the flue gas stream enters heat exchanger 62 at from about 700 to about 1000° F. (371 to 538° C.), and exits heat exchanger 62 at from about 400 to about 700° F. (204 to 371° C.). The flue gas stream passes through a conduit 56a to a flue gas dehydration zone 200, as will be described in greater detail below in connction with FIG. 2.

Figure 2:
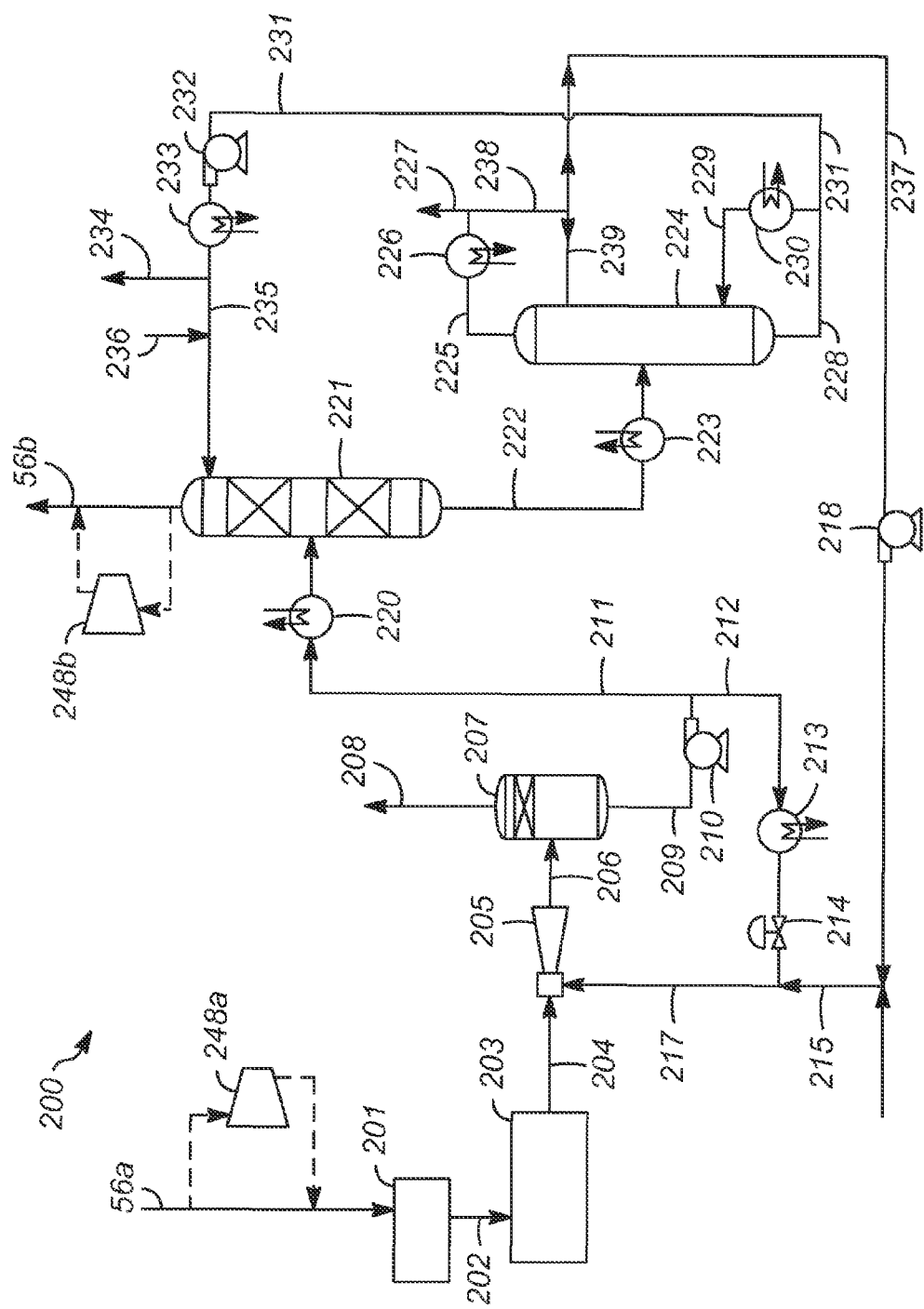
FIG. 2 is a process flow diagram illustrating a chloro-containing species separation zone of a hydrocarbon conversion system as in FIG. 1 in accordance with various embodiments of the present disclosure.

Turning now to FIG. 2 and flue gas dehydration zone 200, as noted above, it is desirable to remove as much water as possible from the flue gas prior to contacting the flue gas with the spent catalyst particles or with another chloro-species adsorbent. Flue gas enters the dehydration zone 200 via line 56a wherein it is first passed through a particle filter 201 that is configured to remove any fine (i.e., less than about 1 mm in diameter or 1 mm in greatest dimension) particles from the flue gas as may have been generated by the combustion/regeneration process, as will be described in greater detail below. The filtered flue gas then passes via line 202 to a dioxin removal module 203 that is configured to remove dioxin species. Dioxin species are byproducts of the combustion/regeneration process, and maybe removed from the filtered flue gas using powdered activated carbon or any other known media or process for the removal of dioxins, such as an oxidative treatment process.

The flue gas, having any dioxin compounds substantially removed therefrom, thereafter passes via line 204 to a scrubber 205, wherein the flue gas is contacted with a water stream 217, wherein the water-soluble components of the flue gas, such as the chloro-species, are dissolved into the water, forming an aqueous acid solution (for example, hydrochloric acid ($HCl_{aq}$)). The aqueous solution and any undissolved gasses are thereafter passed to a separator 207 via line 206, wherein the undissolved gasses are separated from the aqueous acid solution and vented via stream 208. As a result of the scrubbing process, stream 208 contains, for example, less than about 0.01 ppm of chloro-species. The aqueous acid solution of chloro-species passes from the separator 207 via stream 209, whereafter pump 210 directs a small portion (for example, less than about 20%) thereof as a recycle stream 212, which is cooled by heat exchanger 213. The cooled recycle stream thereafter joins with a make-up water stream 215 through valve 214 to form the water stream 217 for use in the scrubber 205.

The non-recycled portion of stream 209 passes as stream 211 to a heat exchanger 220 wherein it is cooled, and then passes to a chloro-species separator 221, which may be provided in the form of an extractive distillation column. Within chloro-species separator 221, the aqueous acid solution is contacted with a hygroscopic liquid, such as sulfuric acid, that separates the chloro-species from the aqueous solution by diluting the hygroscopic liquid and evolving a chloro-species gas as a byproduct of the dilution. As such, contacting the aqueous acid solution with the hygroscopic liquid results in the formation of a chloro-species gas, such as hydrogen chloride gas ($HCl_g$), and a diluted hygroscopic liquid, such as diluted sulfuric acid. Other suitable hygroscopic liquids include solutions of calcium chloride ($CaCl_2$), magnesium chloride ($MgCl_2$), lithium chloride ($LiCl_2$), and zinc chloride ($ZnCl_2$). The chloro-species gas leaves the dehydration zone 200 as a dehydrated flue gas 56b, which is thereafter contacted with the spent catalyst particles (or other chloro-species adsorbent), as initially noted above and as will be described in greater detail below.

The pressure at which the chloro-species separator 221 operates affects the relative recovery of water and chloro-species from the stream 221. For example, operating the separator 221 at a lower pressure results in a lower relative amount of water remaining in the dehydrated flue gas 56b. Table 1 is provided below to illustrate this effect. By way of example only, Table 1 shows that a reduction in base pressure by about 10 psi may result in a reduction in dehydrated flue gas water of about 22%, when the separator 221 temperature and hygroscopic liquid rate were adjusted to maintain constant $HCl_g$ recovery. It is expected that the person having ordinary skill in the art will be able to adjust the operating conditions of the separator 221 to suit a particular application.

TABLE 1

| Chloro-Separator Conditions | Base | Base-10 psi |
|---|---|---|
| Pressure, psia | 50 | 40 |
| Dehydrated flue gas water reduction from Base % | Base | 22% |
| Dehydrated flue gas HCl Recovery, % | 88% | 88% |

In order to effect the operating conditions described above with regard to the separator 221, a compressor may be provided either before or after the separator 221. As shown in FIG. 2, where a higher operating pressure is desired in separator 221, a compressor 248a may optionally be provided along stream 56a, or any other suitable location prior to separator 221. In this implementation, pump 210 would be replaced with a suitable valve. Alternatively, where a lower operating pressure is desired in separator 221, a compressor 248b may optionally be provided along stream 56b, or any other suitable location after separator 221.

The diluted hygroscopic liquid passes via stream 222 to a heat exchanger 223 wherein it is heated prior to being passed to a regenerator 224. The regenerator may be provided in the form of a distillation column including a condenser 226 and a reboiler 230. By heating the diluted hygroscopic liquid in the distillation column 224, the excess water is boiled-off and leaves the column as an overhead product via stream 225, wherein it is passed through condenser 226. A first portion of the condensed water leaves the system 200 via stream 227, a second portion returns to the distillation column as reflux via streams 238 and 239, and a third portion passes to pump 218 via streams 238 and 237, whereafter it is rejoined with the make-up water stream 215. Concentrated hygroscopic liquid leaves the column as a bottom product via stream 228, wherein a first portion is passed through reboiler 230. The reboiler vapor passes via stream 229 back in to the column 224. A second portion continues via stream 231 to pump 232, whereafter it is cooled in heat exchanger 233. A purge stream removes hygroscopic liquid from the system 200 via stream 234, and a make-up stream 236 provides additional hygroscopic liquid to the system 200. The hygroscopic liquid then returns to the separator 221 via stream 235, wherein it may be used to separate chloro-species from the aqeous acid solution, as described above.

Returning to FIG. 1, the dehydrated flue gas stream passes through conduit 56b to a cooler 54. Cooler 54 reduces the temperature of the flue gas stream to a temperature at which the catalyst in the sorption section 50 is maintained. The flue gas stream enters cooler 54 at from about 700 to about 1000° F. (371 to 538° C.), and exits cooler 54 at from about 300 to about 500° F. (149 to 260° C.). The decrease in the water content of the flue gas that contacts the catalyst (or other chloro-species adsorbent) in the sorption zone, as a result of passing the flue gas throught the dehydration zone 200, promotes sorption of chloro-species by decreasing the water that is present and capable of competing with the chloro-species for sorption on the spent catalyst particles (or other chloro-species adsorbent).

A sorption zone 53 in the sorption section 50 is formed by a baffle having a vertically-extended cylindrical section 52 that is concentrically located with respect to the disengaging-sorption vessel 51. The cooled flue gas stream 56b enters into an annular volume 57 that distributes the gas. Distributing volume 57 is defined by the wall of sorption section 50 and the baffle consisting of the concentric cylinder 52 that is secured to the wall of the sorption section 50 by frustoconical section 59. An open bottom of the annular distributing volume 57 allows gas to be distributed about the entire circumference of the distributing volume 57 and about the sorption zone 53.

After sorption of chlorine and hydrogen chloride in the sorption zone 53, a gas stream exits the top of the catalyst bed of the sorption zone 53. The top of the catalyst bed 53 is generally at the elevation of the lower end of the internal conduit 46. Thus, a space 47 is defined by the top of the catalyst bed 53, the bottom of the internal head 38, the outer surface of the wall of the conduit 46, and the inner surface of the wall of the transition section 49. Within this space 47, the gas stream disengages from the catalyst particles. The gas stream exits the disengaging-sorption vessel 51 via a conduit 48. A portion of the gas stream passing through conduit 48 is vented from the process through a conduit 66.

The remaining, nonvented portion of the gas stream passes to a gas blower 68, as will be described hereinafter. The concentration of hydrogen chloride in the flue gas stream passing through conduit 48 is generally from about 10 to about 1000 mol-ppm, for example from about 50 to about 500 mol-ppm. The concentration of chlorine in the flue gas stream passing through conduit 48 is generally from about 1 to about 100 mol-ppm, for example from about 1 to about 10 mol-ppm. The chloride content of the chlorided catalyst leaving the sorption zone 53 may be as much as about 7% by weight of the catalyst weight if the flue gas stream is sufficiently dry and the contact time is sufficiently long; however in many embodiments the content is from about 0.8 to about 1.2%.

After having sorbed chloride in the sorption zone 53, spent catalyst particles exit the disengaging-sorption vessel 51 and enter the regeneration vessel 44 by means of catalyst particle inlet conduits 58. The regeneration vessel 44 has an upper section 83 and a lower section 90 and is cylindrical in form. Looking first at the flow of catalyst particles, conduits 58 discharge catalyst particles into an annular catalyst bed 79 formed by an outer catalyst retention screen 76 and an inner catalyst particle retention screen 78. The volume of catalyst particles in the upper section 83 is located in a combustion zone that is generally denoted as 85. Retention screens 76 and 78 are cylindrical in form and concentric with the regeneration vessel 44. Retention screens 76 and 78 are perforated with holes that are large enough to allow gas to pass through the annular catalyst bed 79 but not permit the passage of catalyst particles therethrough. Outer retention screen 76 extends downward from the bottom of conduits 58 to a wedge section 82 of regeneration vessel 44. Supports 80 guide the top of outer retention screen 76 and keep it centered in regeneration vessel 44. Inner retention screen 78 is attached to the top head of regeneration vessel 44 and extends downward therefrom to a point slightly above the lower end of outer retention screen 76. The bottom 91 of the inner retention screen 78 is open to allow oxygen-enriched and chlorine-containing make-up gas to flow upward from central section 88 to central section 81, as will be described hereinafter. The bottom 86 of the annular catalyst bed 79 is open to allow catalyst particles to empty from the catalyst bed into central section 88 of regeneration vessel 44. From about the bottom of opening 86, the catalyst particles fill the lower section 90 of the regeneration vessel 44. The volume of catalyst particles in the lower section 90 are located in a reconditioning zone that is generally denoted as 89. Catalyst particles in reconditioning zone 89 are statically supported by catalyst particles that extend through the end closure of lower vessel section 90. The catalyst particles are periodically transferred by withdrawing a predetermined volume of catalyst through conduit 99, which in turn allows all the catalyst particles to flow downward through the previous described zones.

As the catalyst particles travel downward through the regeneration process they pass first through the combustion zone 85, which includes the previously-described annular catalyst bed 79. Catalyst particles move axially along the bed 79 by withdrawing catalyst particles depleted in coke deposits by combustion from the outlet end of the bed 79 and adding catalyst particles containing coke deposits to the inlet end of the bed 79. Catalyst that is withdrawn from the combustion zone 85 is referred to herein as combusted catalyst. The coke content of the combusted catalyst may be about 0.01% by weight of the catalyst weight or less, for example about 0.2% by weight or less. Generally, the make-up gas to the combustion section of a reforming catalyst regeneration zone includes air and most of the oxygen in the make-up air is consumed in the combustion of coke. Therefore, the flue gas generally contains from about 70 to about 80 mol-% nitrogen, from about 10 to about 20 mol-% carbon oxides, which is mainly carbon dioxide with trace amounts of carbon monoxide, and from about 0.2 to about 2.0 mol-% oxygen. Oxygen might, however, not be present in the flue gas stream if all of the oxygen is consumed in the combustion of coke in, for example, a multistage combustion zone. The concentration of hydrogen chloride in the flue gas stream that is sent from vessel 44 via line 60 to the dehydration zone 200 and the sorption section 50 is generally from about 500 to about 10000 mol-ppm, for example from about 1000 to about 5000 mol-ppm. The concentration of chlorine in the flue gas stream to the sorption section 50 is generally from about 10 to about 500 mol-ppm, for example from about 25 to about 100 mol-ppm. The concentration of water in the flue gas stream to the dehydration zone 200 is generally from about 1 to about 20 vol-%, for example from about 2 to about 5 vol-%.

Looking now at the flows of gas streams in the regeneration vessel 44, gas that enters the combustion zone 85 through conduit 74 is distributed in an annular chamber 87 that extends around outer retention screen 76 and is defined on its sides by outer retention screen 76 and the vessel wall of upper vessel section 83 and on its bottom by wedge section 82. An upper portion 77 of inner screen 78 is impervious to gas flow, or is otherwise solid, to prevent gas flow from chamber 87 across the top of the regeneration vessel 44. As the flue gas passes through catalyst bed 79, oxygen is consumed in the combustion of coke. The gas that exits the catalyst bed 79 is collected in central section 81. The process of combusting coke removes chloride from the catalyst particles and, therefore, the gas from catalyst bed 79 contains not only water and carbon dioxide but also chloro-species such as chlorine and hydrogen chloride.

The gas that collects in central section 81 of regeneration vessel 44 includes not only gas from catalyst bed 79, but also oxygen-enriched and chlorine-containing make-up gas flowing upward from central section 88. Thus, the flue gas that collects in central section 81 includes gas that will be vented from the combustion zone 85, as well as gas that will be recycled in the combustion zone 85. The flue gas stream leaves central section 81, passes through the heat exchanger 62, the dehydration zone 200, the cooler 54, and the sorption zone 53. The portion of the gas stream that is returned to the combustion zone 85 passes through conduit 64 to blower 68. The recycle gas stream leaves the blower 68 through a conduit 70. The gas steam is heated in heat exchanger 62 by heat transferred from the flue gas stream flowing through conduit 60, as has been described hereinbefore. The recycle stream then passes through conduit 71 to a heater 72. The heater 72 heats the gas stream to carbon-burning temperatures during start-up and to a lesser degree adds heat to the recycle gas stream during normal operation. The heater 72 operates in conjunction with the cooler 62 to regulate the heat content of the gas stream. The gas stream passes through conduit 74 and enters the upper section 83 of regeneration vessel 44.

A gas separation system 120 supplies oxygen-enriched make-up gas to the combustion zone 85. This oxygen-enriched make-up gas is introduced, however, initially to a hereinafter-described reconditioning zone 95, which is in the lower section 90 of the regeneration vessel 44 and from which most of the oxygen in the make-up gas ultimately makes its way to the combustion zone 85. Air in a conduit 115 is dried in a drier 117. Air from drier 117 enters gas separation system 120 through a conduit 116. Separation system 120 produces an oxygen-deficient gas stream, carried by a conduit 114 and an oxygen-enriched gas stream carried by a conduit 112. The oxygen-enriched gas stream is added to regeneration vessel 44 at a rate of addition generally equal to the rate of the gas venting from the conduit 56. The oxygen-enriched gas stream from conduit 112 is taken into a blower 110. Blower 110 discharges the oxygen-enriched gas stream into a drier 102 that reduces the moisture content of the oxygen-enriched gas stream. The dry, oxygen-enriched gas stream is passed by a conduit 103 into a heater 98 that raises the temperature of the oxygen-enriched gas stream to about 1000° F. (538° C.). The heated, dry, oxygen-enriched gas stream is taken by a conduit 96 and mixed with a chlorine stream from a conduit 92 that gives the contents of the mixed stream a chlorine concentration of about 0.11 mol-%. The mixed stream of chlorine and heated, dry, oxygen-enriched gas enter the reconditioning zone 89. Although in this arrangement, the dry, oxygen-enriched gas stream discharged from the heater 98 is all transferred by the conduit 96 to the reconditioning zone 89, other regenerator arrangements may split the heated, dry, oxygen-enriched gas stream from conduit 96 between a drying zone and a redispersion zone.

Catalyst below combustion zone 85 is contacted with the mixed stream of chlorine and heated, dry, oxygen-enriched gas that enters the reconditioning zone 89 through conduit 96. Herein, the catalyst is contacted with a chlorine-containing gas to re-disperse the platinum over the surface of the catalyst. Exposure to the combustion zone serves to agglomerate the platinum on the surface of the catalyst. Once the coke has been removed and the catalyst particles are in various states of oxidation, contact of the catalyst in a chlorine environment will re-disperse the platinum over the surface of the catalyst support. Temperature within the re-dispersion zone may be from about 950 to about 1000° C., and chlorine of about 0.01 to about 0.2 mole percent of the gas in the reconditioning zone, is highly beneficial to promoting rapid and complete re-dispersion of the platinum metal. The re-dispersion step is carried out in the presence of chlorine and an oxygen atmosphere. An oxygen atmosphere is generally employed and desired in carrying out the re-dispersion step. The presence of oxygen aids in the re-dispersion of the metallic catalyst components on the carrier. A lower water concentration in the environment of the reconditioning section also facilitates the re-dispersion by maintaining a high chlorine concentration in the reconditioning zone. The concentration of chlorine in the reconditioning section is governed by the Deacon equilibrium equation:

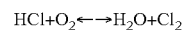

$$HCl+O_2 \leftarrow\!\!\rightarrow H_2O+Cl_2$$

Therefore, to the extent that the catalyst entering the reconditioning section has a lower water concentration, it will favor the shift to the right of the equation, thereby producing more chlorine for the re-dispersion step. Greater detail regarding platinum re-dispersion may be found in commonly-assigned U.S. Pat. No. 5,087,792, the contents of which are incorporated herein by reference.

As such, in a further embodiment of the present disclosure, as an alternative to or in addition to contacting the spent catalyst as described above, some or all of the dehydrated flue gas from stream 56b may be redirected to join with (or near) the oxygen/chlorine streams 96/92 for use in the re-dispersion step in the reconditioning zone 95. This optional stream is shown as stream 56c in FIG. 1. The flue gas stream having been dehydrated as noted above, the use thereof for the re-dispersion step favors the above-noted Deacon equilibrium, and additionally results in the need for less gas to be provided to the system in streams 96/92, thus reducing overall operational costs (energy and materials).

Most of the entering gas, including most of the oxygen as well as some of the chlorine and some hydrogen chloride produced from the chlorine, reaches an upper portion of the reconditioning zone 89 and passes into a central portion 88 of the regeneration vessel 44. Central portion 88 is formed by the cylindrical wall of the lower section 90. The gas that passes through the central portion 88 passes upward through the bottom opening 91 of the inner retention screen 78 and enters the central section 81. Although in this arrangement, all of the oxygen-enriched and chlorine-containing gas that reaches the top of the reconditioning zone 89 transfers to the central portion 88, other regenerator arrangements may split the oxygen-enriched gas between the central portion 88 and a gas collection volume that collects a portion of the oxygen-enriched gas and vents it from the regeneration vessel 44.

The catalyst at the bottom of the central portion 88 flows into the reconditioning zone 89 of regeneration vessel 44. Reconditioning zone 89 is formed by a baffle having a vertically extended cylindrical section 95 that is concentrically located with respect to the regeneration vessel 44. Previously-described, heated, dried, chlorine-containing, oxygen-enriched gas enters via conduit 96 into an annular volume 97 that distributes the gas. Distributing volume 97 is defined by the wall of lower vessel section 90 and a baffle consisting of a concentric cylinder 94 that is secured to the lower vessel section 90 by frusto-conical section 84. An open bottom of distributing volume 97 allows gas to be distributed about the entire circumference of the annular distributing volume 97 and about the reconditioning zone 89. Catalyst duration within the reconditioning zone 89 is governed principally by the length of cylindrical section 95.

After removal of coke and reconditioning of catalyst particles in the regeneration vessel 44, the catalyst particles are in a regenerated condition, in which the catalyst metal is oxidized and redispersed and in which the catalyst particles are dried. It should further be noted that, after the platinum has been re-dispersed on the catalyst, catalyst from the re-dispersion zone must be reduced to change the platinum on the catalyst to an elemental state by reduction. Consequently, in most processes, the catalyst will be contacted with a hydrogen-rich reduction gas before being used for catalytic purposes. Reduction of the highly oxidized catalyst with a relatively pure hydrogen reduction gas will restore essentially all of the catalytic activity to the platinum metal. The hydrogen-rich reduction gas will typically have a hydrogen concentration of about 85 mole percent. The hydrogen gas will contact the catalyst at a temperature of about 900° C. Although reduction of the oxidized catalyst is an essential step in most dehydrogenation operations, the step is usually performed just ahead or within the reaction zone and is not generally considered a part of the apparatus for the regeneration process (and as such is not shown in FIG. 1).

A conduit 99 transfers the regenerated catalyst to a nitrogen seal drum 101 and a lock hopper arrangement 108. A conduit (not shown) may provide a location for introducing additional catalyst into the catalyst transport system via the conduit 99. The seal drum 101 and lock hopper arrangement 108 control the transfer of the regenerated catalyst particles back to the stacked reactor arrangement 24 via the previously-described non-mechanical valve 12 and lift conduit 16. The nitrogen seal drum 101 and lock hopper arrangement 108 also displace oxygen gas from the stream of partially-regenerated catalyst particles to prevent any carry-over of oxygen into the reactor side of the process. Seal drum and lock hopper arrangements are well known to persons skilled in the art and may be used in any of their well-known forms to supply a flow of catalyst into lower conduit 10, the point in the flow of catalyst through system 100 at which the description of the exemplary process began.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the application in any way. Rather, the foregoing detailed description will provide those skilled in the art with a convenient road map for implementing one or more embodiments, it being understood that various changes may be made in the function and arrangement of elements described in an exemplary embodiment without departing from the scope, as set forth in the appended claims.

What is claimed is:

1. A method for separating a chlorine-containing species from an aqueous solution of the chlorine-containing species in a catalytic hydrocarbon conversion process, the method comprising the steps of:
    oxidizing a spent chloride-containing hydrocarbon conversion catalyst, the spent hydrocarbon conversion catalyst comprising a hydrocarbon residue formed thereon, wherein the oxidizing forms a flue gas comprising chlorine-containing species, water, and oxides of carbon;
    contacting the flue gas with a water scrubbing stream to dissolve at least a portion of the chlorine-containing species in the water scrubbing stream to form a liquid aqueous acid solution;
    separating and venting un-dissolved gases from the liquid aqueous acid solution wherein said un-dissolved gases comprise less than 0.01 ppm of a chloro-species;
    contacting the liquid aqueous acid solution with a hygroscopic liquid to generate a dehydrated hydrogen chloride gas; and
    contacting the dehydrated hydrogen chloride gas with additional spent chloride-containing hydrocarbon conversion catalyst to sorb chlorine onto the additional spent chloride-containing hydrocarbon conversion catalyst.

2. The method of claim 1, wherein oxidizing the spent chloride-containing hydrocarbon coversion catalyst comprises combusting in the presence of oxygen gas ($O_2$).

3. The method of claim 2, wherein the oxidizing the spent chloride-containing catalyst further comprises forming a regenerated chloride-containing catalyst.

4. The method of claim 3, further comprising contacting the regenerated chloride-containing catalyst with a hydrocarbon feed stream in a process selected from the group consisting of: reforming, dehydrogenation, isomerization, alkylation, and transalkylation.

5. The method of claim 1, wherein forming the flue gas comprising the chlorine-containing species comprises forming a flue gas comprising hydrogen chloride.

6. The method of claim 1, wherein contacting with the hygroscopic liquid comprises contacting with a hygroscopic liquid selected from the group consisting of: solutions of calcium chloride ($CaCl_2$), magnesium chloride ($MgCl_2$), lithium chloride ($LiCl_2$), and lithium zinc chloride ($ZnCl_2$).

7. The method of claim 1, wherein contacting with the hygroscopic liquid further comprises forming a diluted hygroscopic liquid.

8. The method of claim 7, further comprising regenerating the diluted hygroscopic liquid.

9. The method of claim 1, further comprising oxidizing the additional spent chloride-containing hydrocarbon conversion catalyst to generate additional flue gas.

10. A method for separating a chlorine-containing species from an aqueous solution of the chlorine-containing species, the method comprising the steps of:
    oxidizing a spent chloride-containing hydrocarbon conversion catalyst comprising platinum/tin on chlorided alumina, the spent hydrocarbon conversion catalyst comprising a hydrocarbon residue formed thereon, wherein the oxidizing forms a flue gas comprising chlorine-containing species, water, and oxides of carbon;
    contacting the flue gas with a water scrubbing stream to dissolve at least a portion of the chlorine-containing species in the water scrubbing stream to form a liquid aqueous acid solution;
    separating and venting un-dissolved gasses from the liquid aqueous acid solution wherein said un-dissolved gases comprise less than 0.01 ppm of a chloro-species;
    contacting the liquid aqueous acid solution with a hygroscopic liquid to generate a dehydrated hydrogen chloride gas; and
    contacting the dehydrated hydrogen chloride gas with the oxidized chloride-containing hydrocarbon conversion catalyst to sorb chlorine onto the oxidized chloride-containing hydrocarbon conversion catalyst.

11. The method of claim 10, wherein oxidizing comprises combusting the hydrocarbon residue in the presence of oxygen gas ($O_2$).

12. The method of claim 11, wherein oxidizing comprises forming a regenerated chloride-containing catalyst.

13. The method of claim 12, further comprising contacting the regenerated chloride-containing catalyst with a hydrocarbon feed stream.

14. The method of claim 10, wherein the chlorine-containing species comprises hydrogen chloride.

15. The method of claim 10, wherein the hygroscopic liquid is selected from the group consisting of: solutions of calcium chloride ($CaCl_2$), magnesium chloride ($MgCl_2$), lithium chloride ($LiCl_2$), and zinc chloride ($ZnCl_2$).

16. The method of claim 10, further comprising forming a diluted hygroscopic liquid.

17. The method of claim 1, further comprising contacting the dehydrated hydrogen chloride gas with additional spent chloride-containing hydrocarbon conversion catalyst.

* * * * *